United States Patent Office 3,255,082

Patented June 7, 1966

1

2

3,255,082

METHOD OF PREPARING STABLE ALUMINUM CHLORHYDRATE-ALKALI METAL- AND ALKALINE EARTH METAL SALT COMPLEX ANTIPERSPIRANT STICK

Stanley Barton, Springfield Township, Hamilton County, Ohio, assignor to The Procter & Gamble Company, Cincinnati, Ohio, a corporation of Ohio No Drawing. Filed Apr. 16, 1962, Ser. No. 187,946
3 Claims. (Cl. 167—90)

The instant invention relates to antiperspirant preparations having astringent and deodorant properties and more particularly to aluminum chlorhydrate-containing compositions particularly well suited for molding, shaping and forming into solid stick-form antiperspirant products and the like.

It is deemed desirable for cosmetic and other reasons to inhibit or reduce the flow of perspiration from certain areas of the human body for extended periods of time. It is particularly desirable to stop or retard perspiration flow in the axillary areas of the human body.

Cosmetic preparations having perspiration inhibiting or retarding effects are well known in the art. However, most of the antiperspirant compositions are only available in the form of creams, emulsions, lotions, solutions, sprays and the like. The so-called antiperspirant products in stick-form are often in reality deodorants only. As such, they do not inhibit or reduce the flow of perspiration but merely mask the odors associated with exudation.

For ease and convenience of application, stick-form cosmetic preparations are more desirable than the corresponding formulations in liquid or cream form. Stick-form compositions can be applied to the body without involving the fingers in direct contact with the product. Moreover, spillage, leakage and the need for complex applicators are eliminated. For these reasons it is deemed particularly desirable to have a personal type cosmetic preparation in stick form which is not only an effective deodorant but an effective astringent and antiperspirant as well.

Various chemical compounds and complexes have been suggested for use in preventing or reducing the exudation of perspiration. Of the known astringent materials, aluminum chlorhydrate has proved to be the most satisfactory and the most versatile. Aluminum chlorhydrate is an aluminum chlorhydroxide complex having the general empirical formula $Al_2(OH)_{6-n}Cl_n$ wherein $n$ has an average value from about 0.8 to about 1.2. This chemical complex is readily and economically produced by reacting aluminum metal with aluminum chloride in contact with water. Complexes of varying aluminum to chlorine molar ratios can be produced by this procedure. Complexes in which the aluminum to chlorine is present in a molar ratio of about 2:1 have been found to be particularly advantageous for use in antiperspirant formulations.

The search for an effective aluminum chlorhydrate-containing antiperspirant preparation in stick form has prompted numerous approaches, some of which have resulted in partial or moderate success. But, as far as is known, the aluminum chlorhydrate-containing antiperspirant sticks thus far achieved all suffer from notable deficiencies which preclude their successful commercial exploitation.

The well known soap alcohol gel sticks are particularly desirable for dispersing cosmetic preparations because of their physical consistency and excellent yielding properties. When rubbed on the skin, soap sticks leave a thin, even residue which is neither greasy nor tacky. Soap sticks are neither brittle nor do they become brittle after prolonged storage. Unfortunately, soap is an unsatisfactory vehicle for applying metallic astringent compositions such as aluminum chlorhydrate. The astringent metallic ion component of the aluminum chlorhydrate complex is extremely sensitive to the soap component which inactivates the ion.

Alternative means have been suggested to provide a satisfactory aluminum chlorhydrate-containing antiperspirant stick. For example, sequestering agents have been used to complex the aluminum in order to raise the pH of astringent in solution and thereby make it compatible with the soap. The high pH, however, decreases the astringent activity of the normally acid aluminum chlorhydrate.

Incorporating the astringent into a solid wax base consisting of natural and synthetic waxes has also proved to be unsatisfactory. A stick can be made by using a large proportion of fatty and waxy material with an emulsifying agent and a minimum amount of water, but this virtually "waterproofs" the aluminum chlorhydrate and reduces its effectiveness.

U.S. Patent 2,876,163 and Albright & Wilson (Mfg.) Ltd., General Chemical Department bulletin 105/1000/3–59 teach that by using aluminum chlorhydrate and an electrolyte such as an alkaline salt and, in some cases, an alcohol to form an alcogel, viscous astrigent compositions can be prepared which are readily dispersible from collapsible tubes. By varying the proportions of these ingredients within certain limits, the consistency of the finished product can be varied from that of a very soft extrudable gel to that of a very hard stick gel. Alkaline gelling salts, such as potassium acetate, calcium propionate and sodium lactate are used to produce the hard, irreversible gels. These gels are compatible with wetting agents, alcohols, humetants and other similar adjuvants commonly employed in antiperspirant and deodorant stick-form products. It has been found, however, that the solid gels formed by aluminum chlorhydrate and a gelling salt are not well suited for use as antiperspirant sticks because of either excessive stickiness or extreme brittleness. Neither adjusting the proportions of the principal ingredients nor adding additives such as humectants can fully correct this condition.

Accordingly, it is a principal object of this invention to provide an improved aluminum chlorhydrate-containing antiperspirant stick having improved physical characteristics.

It is a further object of this invention to provide a less "draggy," non-brittle antiperspirant stick containing aluminum chlorhydrate as a principal astringent ingredient and an alkaline salt gelling agent.

Another object of this invention is the provision of a process for preparing stable, rigid, non-tacky antiperspirant products in stick-form.

These and other objects will become apparent as the instant invention is more fully described.

Briefly stated, the instant invention comprises the physical modification of aluminum chlorhydrate-alkaline salt-containing irreversible gels by incorporation therein of uniformly dispersed, water insoluble, chemically inert particles. The term "chemically inert" is used herein to denote particles which will not react with the aluminum chlorhydrate or alkaline salt components of said gels. The modifying particles can be oily or waxy substances, wood pulp cellulose fibers, polystyrene and the like. Preferably, the particles are incorporated into one of the principal components of the gel prior to the gelling of the astringent formulation in a manner to be hereinafter fully explained. The particles can, however, be incorporated into the gelling components after the components have been admixed but have not begun to gel. It is essential that the particles be added by a method and in a form which insures that the particles will be substantially uniformly dispersed in the finished product.

Depending on the nature of the modifying particles, the particles are preferably added to either the astringent component, i.e., the aluminum chlorhydrate, or the gelling component, i.e., the alkaline salt, in the form of an oil in water emulsion, a colloidal suspension, or by direct physical addition followed by agitation or stirring to obtain uniform distribution and dispersement of the particles. In all instances, the particles must be greater than about .50 micron in size but must not exceed about 100 microns in size. It is preferred, however, that the particles have a size greater than about .50 micron but less than about 50 microns. In the case of oily or waxy particles added to one of the gel components in the form of an emulsion, it is desirable to use from about 2% to about 15% of the particles based on the weight of the total ingredients in the finished product. When other types of particles such as wood pulp cellulose fibers or polystyrene are employed as modifiers, from about 0.05% to about 5.0% addition is generally satisfactory to obtain the desired results. Therefore, in all instances, the particulate material constitutes from about 0.05% to about 15% by weight of the finished product depending upon the particles employed.

The use of an insufficient quantity of chemically inert, water insoluble particles results in an ineffective modification of the astringent gel. On the other hand, the use of too large a quantity of particles dilutes the astringent ingredient, reducing its effectiveness, and inhibits the formation of the gel. The addition of particulate material within the ranges specified above must be made in view of these considerations in order to realize the benefits of this invention.

The aluminum chlorhydrate employed as a starting material is used in the form of an aqueous solution. It is generally preferred to use a 50% aluminum chlorhydrate solution but more dilute or more concentrated solutions can be used to impart less astringent or more astringent properties to the final product as desired.

The gelling salts include the alkali metal and alkaline earth metal salts of the acetates, propionates and lactates. Although other known gelling salts such as substituted amines can be used, the above-mentioned salts are preferred since they have proved to be efficient gelling agents and can be used either with or without an accompanying gelling alcohol. In particular, sodium lactate has been found to give gels which are most advantageous for use in the present invention. Potassium acetate and calcium propionate are particularly satisfactory gelling agents.

Although alcohol is not an essential gelling ingredient, glycerine or polyhydric glycols having a molecular weight not greater than about 1000 can be used to impart particularly desirable characteristics to the finished stick product. These ingredients increase the strength of the gel structure in the finished product presumably by hydrogen bonding. Hexylene glycol is preferred for this purpose.

Oily or waxy substance particles are incorporated into one of the stick components prior to gelling by adding an emulsion of the modifying particles to either the aqueous solution of aluminum chlorhydrate or the aqueous gelling agent solution before these solutions are admixed to create the astringent gel. Suitable waxy substances include natural and synthetic oils, fats and waxes particularly including mineral oils and waxes; vegetable oils, fats and waxes; and fatty acids and esters thereof all having an average particle size in emulsion greater than about .50 micron but less than about 100 microns and preferably less than about 50 microns. Specific examples of the natural oils and waxes include: beeswax, candelilla, carnauba, spermaceti, coconut oil, cottonseed oil and paraffin; examples of the fatty acids and esters of fatty acids include behenic acid, isopropyl myristate and butyl stearate.

Particulate materials other than waxy substances can be used in the form of a suitable emulsion or sol. Any dispersible, water insoluble, inert material having a particle size greater than about .50 micron but less than about 100 microns, preferably less than about 50 microns, is acceptable so long as the particles themselves are not of an offensive or objectionable nature. For example, pumice of proper particle size is an operable but objectionable material. Pumice will satisfactorily modify the brittleness of the aluminum chlorhydrate-containing gel but its presence creates a drag when the resultant stick is rubbed on the skin. Suitable materials which are not oily or waxy substances but which can be employed in the form of an emulsion or a colloidal solution to modify the physical properties of the aluminum chlorhydrate-containing irreversible gels include polystyrene, alumina, talc, and isopropyl myristate. Still other similar materials will be illustrated in the accompanying examples.

The emulsifier which is necessary in certain embodiments of the instant invention can be any non-toxic, non-irritating emulsifying agent which will act as a suitable emulsifier and yet not react with any of the components. Many such emulsifiers are commercially available. Specific types of these suitable nonionic emulsifiers include those of the sorbitan ester and sorbitan ester-ethylene oxide varieties such as sorbitan monostearate and polyoxyethylene sorbitan monostearate, respectively. Other emulsifiers which are satisfactory and readily available include the polyethylene oxide condensates of alkyl phenols, the water soluble reaction products of ethylene oxide and polypropylene glycol, polyoxyethylene stearate, polyoxyethylene sorbitan monolaurate, sorbitan trioleate and mixtures thereof.

In practicing the present invention, the emulsified material or colloidal suspension of particles is added to the aqueous solution of aluminum chlorhydrate or gelling salt solution at room temperature. Preferably, addition is made to the aqueous astringent solution. Other additives, such as alcohol, dye, perfume, etc. are then added to the mixture of the solution and modifying particles and the ingredients are thoroughly blended. Assuming that the addition of ingredients is made in the preferred manner, an aqueous solution of the alkaline gelling agent is thereafter added and blended with the above ingredients. The mixture is then poured into stick molds, allowed to gel and, when firmly set, removed from the molds. The resultant stick products have high antiperspirant activity, are stable, non-brittle and non-tacky. For convenience, the final mixture of gelling ingredients can be poured into the dispenser in which the astringent gel will be ultimately used and permitted to gel in situ. To speed the gelling process, the gelling mixture can be gently heated.

In one embodiment of this invention, the modifying particles are incorporated in the final stick product without first being emulsified or suspended in a colloidal solution. When particles such as wood pulp cellulose fibers or polystyrene are used for eliminating the tackiness or brittleness of the aluminum chlorhydrate-alkaline salt gels, the particles are added directly to the aqueous solution of aluminum chlorhydrate or alkaline gelling salt and blended therewith prior to the addition of other ingredients. Preferably, the addition is made to the alumnium chlorhydrate solution. An electric mixer can be used to insure complete dispersement of the particles in the aqueous solution, or, alternately, the particles can be distributed by hand stirring which is continued until the gelling salt is added. After the gelling salt is added, the stick product is molded in the same manner as if the particles had been added to the aluminum chlorhydrate solution in the form of an emulsion or sol.

One of the advantages of the instant finished products besides their outstanding physical properties and high astringent activity is their low pH. The pH, which is between 4 and 6, permits the complementary use with the aluminum chlorohydrate of other astringent and/or anticholinergic materials such as zirconium-aluminum complex and the scopolamines, respectively. These ingredients are added to the aqueous solution of aluminum chlorhydrate prior to the addition of any other materials including the modifying particles. Such additional materials are preferably used in amounts which are less than 2% by weight of the aluminium chlorhydrate content of the final stick product.

Because of the high water content in the instant gels, it is preferred to use a humectant such as glycerol, propylene glycol or sorbitan to prevent the gels from drying out when stored or in use. The water content is essential to the maintenance of the activity of the aluminum chlorhydrate. The humectant is preferably added to the aqueous aluminum chlorhydrate solution prior to the addition of the gelling agent and preferably before the addition of the modifying particles.

Low boiling point alcohols can be used in the instant antiperspirant sticks to enhance the pleasing qualities of the finished product. When the stick is rubbed on the skin, the alcohol evaporates and gives a cooling sensation which many users find particularly attractive. Ethyl alcohol is generally used for this purpose but other volatile alcohols such as isopropyl alochol can be used.

Perfumes and coloring agents are used in the proportions necessary to obtain a cosmetic product which is aesthetically pleasing. Without the addition of these agents, the stick products of this invention are opaque and colorless and some have a slight odor primarily attributed to the particular gelling salt or modifying material. Agents to modify these conditions should be added to the aluminum chlorhydrate solution along with the other adjuvants prior to the addition of the gelling salt.

The instant invention will be illustrated in greater detail by the following examples in which all parts are given by weight unless otherwise indicated. The total particulate material content in each example is given in percent by weight. The particulate materials are denoted by an asterisk. Emusified materials have a particle size greater than 0.5 micron but less than 5.0 microns. The average size of the particulate materials which are employed in forms other than emulsions are given in each example wherein such materials are used.

*Example I*

A wax-water emulsion was prepared by mixing the following ingredients for three minutes in a high shear Polytron mixer at 90° C. The ingredients were then slowly agitated until the emulsion cooled to room temperature.

| | Grams |
|---|---|
| Water | 400 |
| Mineral oil * | 50 |
| Spermaceti wax * | 4 |
| Glycerol monostearate * | 20 |
| Butyl myristate * | 8 |
| Behenic acid * | 10 |
| Polyoxyethylene stearate | 10 |
| Sorbitan monostearate | 5 |

Forty ml. of this emulsion was uniformly mixed with 40 ml. of a 50% aqueous solution of aluminum chlorhydrate, 30 ml. of a hexylene glycol, 0.3 gm. of dye and 0.2 gm. of perfume. Twenty-five ml. of a 42% aqueous solution of sodium lactate was added to the above solution, the mixture stirred, poured into a standard deodorant stick dispenser shell and allowed to stand at room temperature until solidified.

The modifying particles (those materials indicated by an asterisk) constitute 4.61 percent by weight of the final stick product based on the weight of the total ingredients in the finished product. When tested for physical properties, this product was judged to be very much like a typical soap-alcohol cosmetic stick.

*Example II*

In the same manner as Example I, a wax-water emulsion was prepared having the following composition:

| | Grams |
|---|---|
| Water | 400 |
| Paraffin * | 50 |
| Mineral oil * | 50 |
| Sorbitan monostearate | 5 |

Forty ml. of this emulsion was then mixed with 40 ml. of a 50% aqueous solution of aluminum chlorhydrate, 30 ml. of hexylene glycol, and 0.17 gm. of n-butyryl scopolamine. To this blend was added 25 ml. of a 42% aqueous solution of sodium lactate. After stirring, the mixture was poured into a standard deodorant stick dispenser and allowed to stand at room temperature until gelled to a stable solid.

The paraffin and mineral oil content is equal to 5.06 percent of the total composition. When used in a standard antiperspirant test, this product was found to reduce perspiration in at least one subject by as much as 70%. Moreover, the product was found to maintain its non-brittle characteristics after prolonged storage.

*Example III*

In the same manner as Example I, a wax-water emulsion was prepared having the following composition:

| | Grams |
|---|---|
| Water | 400 |
| Spermaceti wax * | 100 |
| Sorbitan monostearate | 5 |

Following the general procedure of Example I, 60 ml. of this emulsion was combined with 40 ml. of a 50% aqueous solution of aluminum chlorhydrate, 30 ml. hexylene glycol, and 25 ml. of a 42% aqueous solution of sodium lactate, to produce a solid stick deodorant product.

The spermaceti wax content is 6.74 percent of the finished product. The stick was considered to have excellent physical cosmetic properties and when tested for its effective antiperspirant activity, it was found a reduce perspiration by 35–40%.

*Example IV*

In the same manner as Example I, a wax-water emulsion was prepared having the following composition:

| | Grams |
|---|---|
| Water | 300 |
| Paraffin * | 100 |
| Mineral oil * | 100 |
| Sorbitan monostearate | 5 |

Following the general procedure of Example I, 57 grams of this emulsion was combined with 56.1 grams of a 50% aqueous solution of aluminum chlorhydrate, 23 grams hexylene glycol, 12.6 grams glycerin, 4.0 grams ethyl alcohol, and 31.6 grams of a 42% aqueous solution of sodium lactate. In this preparation, the glycerin and ethyl alcohol were incorporated in the mixture along with the hexylene glycol.

The content of particulate material is 11.82 percent. The resulting stick was rigid and non-tacky and was judged to have good physical properties in use.

*Example V*

Twenty parts by volume of the wax-water emulsion described in Example IV were stirred together with thirty parts of a 50% aqueous aluminum chlorhydrate solution and 29 parts of water. When these ingredients were uniformly mixed, thirty-two parts by volume of a 42% aqueous potassium acetate solution were added, the mixture stirred, and then poured into a standard deodorant stick dispenser shell and allowed to stand at room temperature until solidified.

The total content of modifying ingredients (the paraffin and the mineral oil) is 5.80 percent of the stick product. This product was found to be less brittle and hence more satisfactory for deodorant stick application than a similar stick which did not contain the emulsion.

*Example VI*

The procedure of Example V was followed except that calcium propionate was employed as the gelling salt rather than potassium acetate. The resultant antiperspirant stick was found to possess physical properties substantially similar to the potassium acetate-containing stick of Example V. The sticks of Examples V and VI were judged to have characteristics similar to the stick of Example IV containing sodium lactate.

*Example VII*

An emulsion consisting of 0.3 gram nonyl phenol-ethylene oxide condensate (85% ethylene oxide), 6 grams isopropyl myristate * and 24 grams of water was prepared by mixing the three components together at room temperature and then blending them thoroughly using a high shear Polytron mixer for approximately three minutes. After blending, the emulsion was allowed to cool to room temperature without agitation.

30 ml. of the emulsion were added to a mixture containing 40 ml. of a 50% aqueous solution of aluminum chlorhydrate, 30 ml. of hexylene glycol and 10 ml. of glycerine. After 25 ml. of a 42% aqueous solution of sodium lactate was stirred into the above, the mixture was poured into standard cosmetic stick dispensers where gelation occurred.

The isopropyl myristate is 4.27 percent of the composition based on the weight of the total ingredients of the finished product. The final stick was judged to have properties similar to those of the stick of Example I and superior to those of a stick made from sodium lactate, aluminum chlorhydrate and water.

*Example VIII*

0.125 gram kraft cellulose fibers * was added to 39 grams of a 50 %aqueous solution of aluminum chlorhydrate at room temperature. After the slurry had soaked for 5 minutes, it was agitated for 5 minutes at high speed in a Waring Blendor. To this mixture, 27.6 grams of hexylene glycol and 60 grams of water were added. After being uniformly mixed, 30 grams of a 42% aqueous solution of sodium lactate was added with stirring. The blend was then poured into a standard deodorant stick dispenser and warmed to 42° C. to hasten gelling.

The final stick product includes .08 percent kraft cellulose fibers and has physical properties which were judged to be superior for cosmetic purposes to those of a similar stick formulation composed essentially in the same manner but for the absence of the particulate material.

*Example IX*

Twelve grams of a 50% dispersion of polystyrene * in water were added to 40 ml. of a 50% aluminum chlorhydrate solution, 30 ml. of hexylene glycol, 10 ml. of glycerine and 18 ml. water. The polystyrene solids were dispersed through the mixture using a high shear polytron mixer. Twenty-five ml. of a 42% aqueous solution of sodium lactate were stirred into this mixture and the resultant blend then transferred into standard cosmetic stick dispensers where gelation occurred.

The polystyrene particles have an average size of 2 microns and constitute 3.94 percent of the instant stick composition. The stick containing the polystyrene was found to possess the rigid, non-tacky characteristics of the stick obtained in Example I.

*Example X*

Six grams of U.S.P. Talc * (acid magnesium metasilicate) were added to 41 ml. of a 50% aqueous solution of aluminum chlorhydrate, 30 ml. of hexylene glycol and 10 ml. of glycerine and dispersed therein using a high shear Polytron mixer. Then 25 ml. of a 42% aqueous sodium lactate solution were added and the total mixture stirred by hand to keep the talc suspended until gelation had proceeded far enough that the viscosity of the mix was high enough to prevent the talc from settling out of solution. At this point, the mixture was transferred to standard cosmetic stick dispensers where gelation proceeded to completion.

A sieve analysis showed that approximately 95% of the talc employed in this example had a particle size between 37 microns and 44 microns. The stick modified with these particles resembled the stick obtained in Example I which was judged to be superior in its cosmetic properties to the unmodified aluminum chlorhydrate, sodium lactate and water antiperspirant stick.

*Example XI*

Six grams of Baymal,* du Pont colloidal alumina (aluminum oxide), were dispersed in 24 grams of water and then allowed to stand for two hours to effect a more complete dispersion. The Baymal dispersion was then stirred into a mixture consisting of 40 ml. aqueous solution of 50% aluminum chlorhydrate, 30 ml. of hexylene glycol, and 10 ml. of glycerine. Twenty-five ml. of a 42% aqueous sodium lactate solution were stirred into the above mix. The mix was then transferred to standard cosmetic stick dispensers where gelation took place.

The colloidal alumina modified product was neither sticky nor brittle but was found to possess the physical properties characteristic of a typical soap-alcohol cosmetic stick. Similar results can be achieved by lowering the colloidal alumina content from the 3.92 percent of the instant example to about 1.00 percent or lower.

*Example XII*

Sticks of the following formulae were prepared in order to demonstrate the comparative effect of adding modifying particles to an aluminum chlorhydrate, sodium lactate astringent gel stick. The emulsion was prepared as described in Example I. Proportions are given by volume in milliliters.

| Component | Formula | | |
|---|---|---|---|
| | 1 | 2 | 3 |
| Aluminum chlorhydrate (50% aqueous solution) | 40 | 40 | 40 |
| Sodium lactate (42% aqueous solution) | 25 | 25 | 25 |
| Hexylene glycol | 30 | 30 | 30 |
| Glycerine | 10 | 10 | 10 |
| Emulsion* | 30 | ----- | ----- |
| Water | ----- | 30 | ----- |

Formula 1 exhibited superior cosmetic properties. It was easily applied to the skin in a thin, even coating which was neither greasy nor tacky. Formula 2 demonstrates the effect of replacing the emulsion of Formula 1 with an equal volume of water. Formula 2 made a noticeably wetter and more brittle stick than Formula 1. The wetness allowed the stick material to be applied easily but the stick began to crack and crumble after repeated use. Formula 3 demonstrates the effect of not adding the emulsion of modifying particles to the aluminum chlorhydrate, sodium lactate formulation. This formula was found to be more brittle than Formula 2. It was too dry to slide over the surface of the skin when rubbed on the skin.

The sticks prepared in accordance with Examples I to XI had excellent physical properties and characteristics. None were excessively sticky nor extremely brittle. When tested for antiperspirant effectiveness, they reduced perspiration significantly.

In the specification and claims, the terms "alkaline salt," alkaline gelling salt," etc., refer to salts having a pH above about 6.5 in aqueous solution, for example, sodium lactate, potassium acetate and calcium propionate, etc. The term "waxy substances" is used in the specification and claims to generically describe natural and synthetic oils, fats and waxes.

While many apparently widely different embodiments of this invention may be made without departing from the spirit and scope thereof, it is to be understood that this invention is not limited to the specific embodiments set forth herein and that only such limitations may be imposed on the appended claims as are stated therein.

What is claimed is:

1. A process for preparing a solid stable antiperspirant composition in stick form containing aluminum chlorhydrate and an alkaline salt selected from the group consisting of alkali metal and alkaline earth metal acetates, propionates and lactates which comprises admixing with and uniformly dispersing in the aluminum chlorhydrate and alkaline salt prior to the irreversible gelling of these ingredients from about 2.0% to about 15% by weight of said stick of at least one emulsified waxy substance selected from the group consisting of natural and synthetic fats, oils and waxes, said waxy substance having a particle size in the range of about .50 micron to about 50 microns effective to improve the physical characteristics of said gel without adversely affecting its antiperspirant properties.

2. A process as set forth in claim 1 in which the alkaline salt is selected from the group consisting of potassium acetate, calcium propionate and sodium lactate.

3. A process as set forth in claim 1 in which the waxy substance is selected from the group consisting of mineral oil, beeswax, candelilla, carnauba, spermaceti and paraffin.

References Cited by the Examiner

UNITED STATES PATENTS

| | | | |
|---|---|---|---|
| 2,087,161 | 7/1937 | Moore | 167—90 |
| 2,087,162 | 7/1937 | Moore | 167—90 |
| 2,689,815 | 9/1954 | Gershon | 167—87.1 |
| 2,876,163 | 3/1959 | Garizio | 167—90 |
| 2,933,433 | 4/1960 | Teller | 167—90 |

FOREIGN PATENTS

| | | |
|---|---|---|
| 880,261 | 10/1961 | Great Britain. |

OTHER REFERENCES

Pears, Perfumery & Essential Oil Record, 44:3, March 1953, pp. 84–90, 101.

Sagarin, Cosmetics Sci. & Tech., Interscience Publ., N.Y., 1957, pp. 403–404.

JULIAN S. LEVITT, *Primary Examiner.*

FRANK CACCIAPAGLIA, Jr., *Examiner.*

ANNA P. FAGELSON, VERA C. CLARKE, *Assistant Examiners.*